United States Patent [19]
Kwon et al.

[11] Patent Number: 6,063,842
[45] Date of Patent: May 16, 2000

[54] THERMAL TRANSFER INK LAYER COMPOSITION FOR DYE-DONOR ELEMENT USED IN SUBLIMATION THERMAL DYE TRANSFER

[75] Inventors: Oh-Seung Kwon; Jeong-Seok Seo; Yong-Cheol Shin, all of Kyunggi-Do; Tae-Woon Cha; Eun-Seong Kim, both of Seoul, all of Rep. of Korea

[73] Assignee: Hansol Paper Co., Ltd., Seoul, Rep. of Korea

[21] Appl. No.: 09/075,189

[22] Filed: May 11, 1998

[51] Int. Cl.[7] ................ C08L 1/14; C08L 1/28; C08L 59/00; C08L 31/04
[52] U.S. Cl. ................ 524/40; 524/35; 524/37; 524/38; 524/39; 524/42; 524/43; 524/44
[58] Field of Search ................ 524/35, 36, 37, 524/38, 39, 40, 41, 42, 43, 44, 45, 46

[56] References Cited

U.S. PATENT DOCUMENTS

| | | | |
|---|---|---|---|
| 4,051,306 | 9/1977 | Tobias et al. | 524/37 |
| 4,197,222 | 4/1980 | Wegmann | 524/37 |
| 4,650,494 | 3/1987 | Kutsukake et al. | 8/471 |
| 4,700,207 | 10/1987 | Vanier et al. | 503/227 |
| 4,849,457 | 7/1989 | Ichii et al. | 521/62 |
| 5,175,055 | 12/1992 | Tsukahara et al. | 428/474.4 |
| 5,514,733 | 5/1996 | Ito et al. | 524/43 |
| 5,601,638 | 2/1997 | Fukuda et al. | 524/42 |
| 5,710,195 | 1/1998 | Subbaraman et al. | 524/46 |

FOREIGN PATENT DOCUMENTS 0 271 861   6/1988   European Pat. Off. .

*Primary Examiner*—Peter A. Szekely
*Attorney, Agent, or Firm*—Finnegan, Henderson, Farabow, Garrett & Dunner, L.L.P.

[57] ABSTRACT

The present invention relates to a thermal transfer ink layer composition, wherein polyvinylacetal resin and cellulose derivatives are used in a mixture for the binder in the thermal transfer ink layer composition of the sublimation thermal transfer ink ribbon, or the another type of a binder is mixed into the mixture of polyvinylacetal resin and cellulose derivatives and so used therein. As a result, the adhesion between the thermal transfer ink layer and substrate film, and the gradation property of printed images are improved as compared to the case in which the respective binders are used individually. More particularly, the present invention relates to the thermal transfer ink layer composition of the sublimation thermal transfer ink ribbon, which can yield high quality images by means of the aforementioned improvements.

5 Claims, No Drawings ns. These signals are then transmitted to a thermal printer. To obtain a print, yellow, magenta, cyan and/or black dye-donor elements are placed face-to-face with the dye-receiving element. The dye-donor element and dye-receiving element are then inserted between the thermal printing head and platen roller. The thermal printing head applies heat from the back of the dye-donor element. The thermal printing head has many heating elements and is heated sequentially in response to the yellow, magenta, cyan or/and black signals.

THERMAL TRANSFER INK LAYER COMPOSITION FOR DYE-DONOR ELEMENT USED IN SUBLIMATION THERMAL DYE TRANSFER

BACKGROUND OF THE INVENTION

1. Field of the Invention

The present invention relates to a thermal transfer ink layer composition, wherein polyvinylacetal resin and cellulose derivatives are used in a mixture for the binder in the thermal transfer ink layer composition for the dye-donor element used in sublimation thermal dye transfer, or another type of a binder is mixed into the mixture of polyvinylacetal resin and cellulose derivatives and so used therein. As a result, the adhesion between the ink layer and substrate film, and the gradation property of printed images are improved as compared to the case in which the respective binders are used individually. More particularly, the present invention relates to the thermal transfer ink layer composition of the sublimation thermal dye transfer ink ribbon, which can produce high quality images by means of the aforementioned improvements.

2. Description of the Prior Art

The electrophotography, ink jet, thermal transfer methods, etc are generally used for printing color images. Among these methods, the thermal transfer methods have advantage in that they produce no noise during printing, the apparatus therein is relatively inexpensive and compact, and maintenance thereof is easy. Depending on the physical property of the transfer ink layer, the thermal transfer method can be further categorized into the melting and sublimation type methods.

Under the melting type method, the transfer ink layer is heated and melted by means of the heating element, after which is transferred to the receiving element and solidified. During the transfer process, not only the colorants but also the binder are transferred to the receiving element. As such, in the above method, it is impossible to obtain an image having an essentially continuous gradation as in photograph. On the other hand, under the sublimation type method, the thermal transfer ink layer consists of the sublimable dye having heat transferability and the binder resin. Only the dye in proportion to the applied heat by means of the heating element is transferred to the receiving element, and the images are formed on the receiving element. As such, the method is commonly called the dye diffusion thermal transfer type. Under the sublimation type method, the amount of the transferred dye is controlled by the applied thermal energy. Consequently, the method has an advantage in that it is possible to obtain an image having continuous gradation. As such, the method is commonly used in the automated office equipment, such as facsimile and copier in addition to the areas in CAD, CAM, and graphic design. The method is also widely used in an area in which the electronic images from color video camera are printed via color printer.

The recording principle of the sublimation thermal transfer printing method is as follows: Under said thermal transfer recording method, an electronic picture is first subjected to color separation by color filter. The respective color-separated images are then converted into corresponding electrical signals. These signals are then operated on to produce yellow, magenta, cyan and/or black electrical signals. These signals are then transmitted to a thermal printer. To obtain a print, yellow, magenta, cyan and/or black dye-donor elements are placed face-to-face with the dye-receiving element. The dye-donor element and dye-receiving element are then inserted between the thermal printing head and platen roller. The thermal printing head applies heat from the back of the dye-donor element. The thermal printing head has many heating elements and is heated sequentially in response to the yellow, magenta, cyan or/and black signals.

As for the sublimation thermal transfer ink ribbon, one side of the substrate film is applied with the thermal transfer ink layer. Between said ink layer and substrate film, an adhesive layer is formed for the purposes of improving the adhesion between the ink layer and the substrate film. The opposite side of the thermal transfer ink layer may be coated with a heat resistant lubrication layer in order to prevent the printing head from sticking to the dye-donor element.

Further, said thermal transfer ink layer consists of a polymeric binder, sublimable dye which is transferred to the receiving element by means of heat, and other additives. As for preparing the sublimation thermal transfer ink ribbon, the selection of the binder resin with appropriate physical property is of great importance. The requirement of the physical property of the binder resin is as follows:

1. In order to obtain high transfer sensitivity, the dye from the transfer ink layer to the receiving element must be easily transferable.
2. The adhesion must be superior with respect to the substrate of the sublimation thermal transfer ink ribbon.
3. There must be no melt adhesion onto the receiving element during printing.
4. There must be adequate affinity with respect to the dye, and re-crystallization of the dye must not occurred
5. In order to obtain superior gradation, the transfer sensitivity should be low at low printing energy.

As for the results of research for obtaining a binder with the satisfactory requirements as above, the methods for using a variety of binders on the thermal transfer ink layer of the sublimation thermal transfer ink ribbon have been proposed.

U.S. Pat. No. 4,700,207 discloses the use of resins of the cellulose derivatives as binder, namely, cellulose acetate butyrate, ethyl cellulose, cellulose acetate phthalate, etc. However, the resins of said cellulose derivatives lack adhesion with respect to the widely used substrate film, the polyethyleneterephthalate film. For this reason, the transfer ink layer may separate from the substrate film during printing.

Further, the methods of using the resins in the polyvinylacetal, such as polyvinylbutyral (U.S. Pat. No. 4,650,494), polyvinylacetoacetal (European Pat. No. 0,271,861), have been respectively disclosed. A generally high transfer sensitivity can be obtained from polyvinylbutyral, but the high transfer sensitivity at low printing energy results in a poor gradation. As such, polyvinylacetoacetal resin has the disadvantage of having a low transfer sensitivity.

SUMMARY OF THE INVENTION

Various problems with respect to said sublimation thermal transfer ink ribbon have been studied by the inventors herein. As a result of such studies, the polyvinylacetal resin and the resins in the cellulose derivative group were mixed and so used for the binder element in the thermal transfer ink layer composition. Alternatively, another binder element was mixed into the mixture of polyvinylacetal resin and cellulose derivatives and so used for the same purposes. With the improvement and supplemental effects therefrom, the invention has been so devised in which the superior physical property and gradation expression could be obtained.

The present invention comprises a novel binder composition in the thermal transfer ink layer composition and possesses superior adhesion between the thermal transfer ink layer and the substrate film. As such, the first objective of the invention herein lies in providing a thermal transfer ink layer, wherein it is possible to obtain high quality images by means of improvement in the gradation property of printed images. The second objective of said invention lies in providing a thermal transfer ink layer which has an improved adhesion between the thermal transfer ink layer and substrate film.

DETAILED DESCRIPTION OF THE INVENTION

The present invention is characterized in that the mixture comprising polyvinylacetal resin and the resins in the cellulose derivative group are used for the binder in the thermal transfer ink layer composition of the sublimation thermal transfer ink ribbon.

On one side of the substrate film, the heat-resistant lubrication layer is applied thereto. On the other side, the thermal transfer ink layer having the sublimable dye has been applied. As for the binder in said thermal transfer ink layer composition, the polyvinylacetal resin and the resins in the cellulose derivative group are mixed and so used. Alternatively, another binder can be mixed into the mixture of polyvinylacetal resin and cellulose derivatives and so used for the same. Consequently, the adhesion between the thermal transfer ink layer and the substrate film is improved thereby. As such, the invention herein relates to a new thermal transfer ink layer composition having superior gradation property by means of the aforementioned attributes.

The polyvinylacetal resins used in said invention include polyvinylacetoacetal, polyvinylbutyral resins, and the mixture thereof. In order to obtain these polyvinylacetal resins, polyvinylacetate is saponified into polyvinylalcohol, which in turn is condensated with aldehyde. Consequently, these resins are tertiary polymers comprising vinylacetate, vinylalcohol and vinylacetal. The respective contents thereof may vary depending on the saponification level and reaction level with aldehyde. The preferable mole contents of the respective substituent groups of the polyvinylacetal resin are as follows: 50~80% for vinylacetal group, 15~40% for vinylalcohol group, and 1~ 20% for vinylacetate group. The mole contents of said groups are closely related to the amount of the hydroxy group, which is a hydrophilic binder composition and affects the physical property of the binder therein.

The resins of the cellulose derivative group used in conjunction with the polyvinylacetal resins under said invention include one or more resins selected from cellulose derivatives soluble in organic solvent, namely, hydroxy ethylcellulose, hydroxy propylcellulose, cellulose acetate butyrate, cellulose acetate phthalate, etc. The two main compositions, polyvinylacetal resins and the cellulose derivatives, used in said inventions are essential as binder compositions. In addition, other binders used in said invention includes polyvinylacetate and phenoxy resins.

The polyvinylacetal resins and the cellulose derivatives used as binder of the sublimation thermal transfer ink layer in said inventions have been so used individually in the prior arts. Polyvinylacetate or phenoxy resins used as an alternative binder element have been also used individually in the prior arts. Although the individual usages of the above compositions have been disclosed in the prior arts, the mixture of the aforementioned compositions as in said invention shows unexpected yet significant improvements in terms of adhesion between the ink layer and substrate film, and gradation property of printed images.

In particular, when these resins are used individually, the problem arises in which the adhesion between the substrate film and the thermal transfer ink layer deteriorates, or the gradation becomes defective. However, when these resins are mixed in proper proportions and so used therein, the superior physical property emerges which cannot possibly be anticipated from the individual application thereof.

Although the reasons for such superior property are not clear as of this application, it is thought that the following two reasons are attributable to the manifestation of such superior property when the mixture is used.

First, when these resins are mixed, the amount of the hydroxy group in the total binder changes. The sublimable dyes used in the sublimation thermal transfer printing media are in general hydrophobic. To the extent of the change in the amount of the hydrophilic hydroxy group in the binder, the affinity of the dye to the binder changes thereby. With a decrease in the amount of the hydroxy group in the binder resins, the affinity between the dye and binder resins increases. As such, during the thermal transfer, more energy is required to diffuse the dyes in the binder resins, thereby reducing the transfer sensitivity. On the other hand, if the amount of the hydroxy group is increased, the opposite results follow. Consequently, it is thought that when the binders as in the present invention are mixed, the amount of the hydroxy group in the total binder changes with the effect of controlling the transfer sensitivity. The interaction between the dye layer and substrate film also changes based on the changes in the amount of the hydroxy group, thereby by allowing the control of the adhesion between the dye layer and substrate film.

Second, by mixing these resins and using them in the thermal transfer dye layer. the glass transition temperature changes with the result of improving the transfer sensitivity. To the extent that the glass transition temperature of the binder is lowered, the free volume in the binder matrix for dye diffusion increases, which in turn increases the transfer sensitivity. By mixing and using various binder elements with different glass transition temperatures, the multiple glass transition temperatures result at the dye layer. Consequently, the control of the transfer sensitivity is easier than the case in which the element is individually used.

The preferable mixing ratio between said polyvinylacetal resin and the resin in cellulose derivatives by weight part is 100 parts to 50~200 parts, respectively. When the mixing ratio deviates from the above range, the target effect of said invention cannot be obtained.

In the case of mixing an alternative binder element to the mixture of the polyvinylacetal resin and the resin in the cellulose derivative group, 10~70 weight parts of said binder element should be mixed to 100 weight parts of said mixture. When the mixing ratio deviates from the above range, the target effect of said invention cannot be obtained.

Further, the mixing ratio between said mixture of the binder resins and the dye should be 100 weight parts to 30~200 weight parts, respectively. If the amount of the dye is below 30 weight parts, then the transfer sensitivity becomes excessively low where as if it exceeds 200 weight parts, the adhesion of dye layer with respect to the substrate film deteriorates.

As stated above, the thermal transfer ink layer composition under said invention comprises the binder mixture, sublimable dye, which is transferred to the receiving element by means of heat, anti-oxidant, ultraviolet absorbent, dye crystallization inhibitor, and other various additives.

Any dye can be used in the dye-donor element of the invention provided it is transferable to the dye-receiving layer by the action of heat. Especially good results have been obtained with sublimable dyes. Examples of sublimable dyes include Magenta VP, MS Red G, Macrolex® Red Violet R, MS Magenta HM-1450, etc. for red color, Waxoline® Yellow GFW, Kayaset Yellow GN, Foron® Brilliant Yellow 6GL, etc. for yellow color, and Kayaset Blue 714, Waxoline® Blue AP-FW, MS Cyan HM-1238, MS Cyan HSO-16, etc. for blue color. These dyes are used individually or in combination in appropriate proportions. The thickness of the thermal transfer ink layer upon application should be controlled at 0.5~5.0 µm in dry state.

The dye layer of the dye-donor element may be coated on the substrate or printed thereon by means of a printing technique such as Gravure process. Any material can be used as a substrate for the dye-donor element of the invention provided it is dimensionally stable and can withstand the heat of the thermal printing heads. Such materials include polyester films such as polyethyleneterephthalate, or polyamide. polyacrylate, polycarbonate, cellulose ester, fluoresins, polyacetal, or polyimide film. Among these films, it is preferable to use polyethyleneterephthalate due to its economical consideration and mechanical strength. The thickness of the substrate in the range of 2~20 µm is most appropriate. If desired, the adhesive layer may be coated onto the substrate for improving the adhesion between the dye-layer and substrate. Alternatively, the substrate is often treated with Corona or plasma process. The reverse side of the dye layer may be coated with a heat resistant lubrication layer to prevent the printing head from sticking to the dye-donor element and allowing free movement underneath the printing head. Such heat-resistant lubrication layer comprises a lubricating material such as a surface active agent, a liquid lubricant, a solid lubricant or the mixtures thereof, with or without a polymeric binder.

The receiving element used in conjunction with the thermal transfer ink ribbon as above is a sheet material which can accept the dye which is to be transferred thereto. In the case of using paper, metal, glass, or synthetic resin without the dye-accepting property, at least one side should be applied with the dye receiving layer containing the resins with the dye-accepting property.

As for the dye receiving layer, polyester, polycarbonate, vinylchloridevinylacetate copolymer, polyvinylchloride, or ABS resins are used. Recently, the cards manufactured with the polyvinylchloride have been used for manufacturing various identification cards, such as bank card, credit cards, etc.

The invention herein will be explained in more detail based on the following examples without limitations thereby. Without further specification therein, the ratio used in the examples and comparative examples are in weight percentage.

EXAMPLES 1~7

The heat-resistance processed back-side of the polyethyleneterephthalate film (Brand Name : F-531) with the thickness of 5.7 µm was manufactured by Foray Co. (Japan). On the side that has not been treated with the heat-resistance process, said adhesive layer composition was applied using the Mayer Bar No. 4. Thereafter, on the top of such layer, the thermal transfer ink layer composition was applied thereto using the Mayer Bar No. 7. As such, the thermal transfer ink ribbon for recording was manufactured using the steps as above:

Adhesive Layer Composition
p-chlorophenol 3.00%
Toluene 97.00%

TABLE 1

Transfer Ink Layer Composition

|  | Example 1 | Example 2 | Example 3 | Example 4 | Example 5 | Example 6 | Example 7 |
|---|---|---|---|---|---|---|---|
| Dye | 7.00 | 7.00 | 7.00 | 7.00 | 7.00 | 7.00 | 7.00 |
| BX-1 | 2.50 |  |  | 2.50 | 1.70 |  | 1.50 | 1.80 |
| KS-1 |  | 2.50 |  |  | 3.00 |  |  |
| CAB | 2.50 | 2.50 |  | 3.30 |  |  | 2.20 |
| CAP |  |  |  |  | 2.00 |  |  |
| HEC |  |  | 2.50 |  |  |  |  |
| HPC |  |  |  |  |  | 1.50 |  |
| PVAc |  |  |  |  |  |  | 1.00 |
| Phenoxy |  |  |  |  |  | 2.00 |  |
| Toluene | 44.00 | 44.00 | 44.00 | 44.00 | 44.00 | 44.00 | 44.00 |
| DMF | 44.00 | 44.00 | 44.00 | 44.00 | 44.00 | 44.00 | 44.00 |

Note:
Dye: Magenta dye (Mitsui Chemical MS Magenta VP)
BX-1: Polyvinylbutynal (Sekisui Chemical Co. of Japan)
KS-1: Polyvinylacetoacetal (Sekisui Chemical Co. of Japan)
CAB: Cellulose acetate butyrate (Acros Co. of USA)
HEC: Hydroxy ethyl cellulose (Tokyo Kasei Co. of Japan)
HPC: Hydroxy propylcellulose (Hercules Co. of France, Krucel HPC E Type)
PVAc: Polyvinylacetate (Acros Co. of USA)
Phenoxy: Phenoxy resin (Phenoxy Associates of USA, PAPHEN ® PKHH)

Comparative Examples 1~5

Except for the changes in the mixing ratio of the thermal transfer ink layer composition, the same method as used in the examples above was deployed to manufacture the thermal ink ribbon of the sublimation type.

TABLE 2

Thermal Transfer Ink Layer Composition

|         | Example 1 | Example 2 | Example 3 | Example 4 | Example 5 |
|---------|-----------|-----------|-----------|-----------|-----------|
| Dye     | 7.00      | 7.00      | 7.00      | 7.00      | 7.00      |
| BX-1    | 5.00      |           |           |           |           |
| KS-1    |           | 5.00      |           |           |           |
| CAB     |           |           | 5.00      |           |           |
| HEC     |           |           |           |           | 5.00      |
| PVAc    |           |           |           | 5.00      |           |
| Toluene | 44.00     | 44.00     | 44.00     | 44.00     | 44.00     |
| DMF     | 44.00     | 44.00     | 44.00     | 44.00     | 44.00     |

With the Card Printer (Personal Cheetah II™) manufactured by Fargo Co. of USA, the images for gradation assessment were printed by means of said sublimation thermal transfer ink ribbon prepared in examples 1~7 and comparative examples 1~5. As for the receiving element, white PVC card with the thickness of 84 μm was used.

With the Adobe Photoshop® software, the images for gradation assessment were made by dividing 256 gradations of the Magenta color into 10 equal portions. The optical densities of the printed images for gradation assessment were measured by means of the optical density measurement apparatus (McBeth Co. of USA).

The adhesion of the dye layer with respect to polyethyleneterephthalate used in the substrate film was assessed by dividing the area which had been peeled off from the transfer ink layer by means of the Scotch® Magic Tape (3M of USA). The assessment results are shown in Table 3.

In the case of individually using polyvinylacetate or hydroxy ethyl cellulose the transfer ink layer stuck to the PVC card during printing of the gradation image. Consequently, the thermal transfer ink layer peeled off from the substrate film, which made it impossible to measure the transfer sensitivity.

As shown above, the polyvinylacetal resin and the resin in the cellulose derivative group were mixed, or alternatively the other binder was mixed to said resin mixture (Examples 1~7). The mixture was so used for the thermal transfer ink layer binder of the thermal transfer ink ribbon. In such case, the transfer sensitivity was low at low printing energy, and the transfer sensitivity at high printing energy was higher than the case in which the individual resin was used (Comparative Examples 1~5). Therefore, as shown in the results, in the case of using said mixture, the superior gradation property can be so obtained. Further, as shown in the assessment results comparing the peel-off areas, the adhesion of dye layer with respect to the substrate film in the examples were markedly improved as compared to the case in which of the individual binder element was used (Comparative Examples 1~5).

TABLE 3

Assessment Results

|  | Gradation Property | | |
|---|---|---|---|
| Tests | 1 STEP | 2 STEP | Adhesion* |
| Example 1 | 0.17 | 1.70 | 1 |
| Example 2 | 0.17 | 1.67 | 1 |
| Example 3 | 0.19 | 1.67 | 1 |
| Example 4 | 0.18 | 1.75 | 1 |
| Example 5 | 0.18 | 1.70 | 1 |
| Example 6 | 0.19 | 1.72 | 1 |
| Example 7 | 0.18 | 1.67 | 1 |
| Comparative Example 1 | 0.23 | 1.57 | 1 |
| Comparative Example 2 | 0.24 | 1.55 | 1 |
| Comparative Example 3 | 0.22 | 1.58 | 2 |
| Comparative Example 4 | 0.24 | — | 5 |
| Comparative Example 5 | 0.23 | — | 5 |

*Note:
Assessment Standard for Adhesion

Peel-off area  0%       → 1
              1~25%    → 2
              26~50%   → 3
              51~75%   → 4
              76~100%  → 5

What is claimed is:

1. A thermal transfer ink layer composition of the sublimation te thermal transfer ink ribbon, consisting essentially of a binder having a mixture of polyvinylacetal resin having one ~20 mol % of a vinylacetate group, 15~40 mol % of a vinylalcohol group, and 50~80 mol % of a vinylacetal group and a resin in the cellulose derivative group in an amount from 50~200 parts by weight per 100 parts by weight of the polyvinylacetal resin wherein said resin in the cellulose derivative group is hydroxy ethyl cellulose, hydroxy propyl cellulose, cellulose acetate butyrate or cellulose acetate phthalate.

2. A thermal transfer ink layer composition of the sublimation thermal transfer ink ribbon according to claim 1, wherein said polyvinylacetal resin is polyvinylacetoacetal, polyvinylbutyral, or the mixture thereof.

3. A thermal transfer ink layer composition of the sublimation thermal transfer ink ribbon according to claim 1, wherein said polyvinylacetal resin is a tertiary polymer having vinylacetate, vinylalcohol, and vinyl acetal groups.

4. A thermal transfer ink layer composition of the sublimation type thermal transfer ink ribbon according to any one of claims 1–3, to which a third resin which is a polyvinylacetate or a phenoxy resin is added.

5. A thermal transfer ink layer composition of the sublimation thermal transfer ink ribbon according to claim 4, wherein 10~70 weight parts of said binder is mixed in proportion to 100 weight parts of the mixture of the polyvinylacetal resin and the resin in the cellulose derivative group.

* * * * *

UNITED STATES PATENT AND TRADEMARK OFFICE
CERTIFICATE OF CORRECTION

PATENT NO. : 6,063,842
DATED : May 16, 2000
INVENTOR(S) : Oh-Seung Kwon et al.

It is certified that error appears in the above-identified patent and that said Letters Patent is hereby corrected as shown below:

IN THE CLAIMS:

Claim 1, column 8,
Line 28, change "te" to --type--.

Claim 5, column 8,
Line 52, change "binder" to --third resin--.

Signed and Sealed this

Third Day of July, 2001

*Attest:*

NICHOLAS P. GODICI
*Attesting Officer*   *Acting Director of the United States Patent and Trademark Office*